3,703,476
METHOD FOR FORMING AN OILY FLUID-WATER-SOLUBLE SOLID PARTICLES SLURRY
Paul E. Titus, Houston, Tex., assignor to
Shell Oil Company, New York, N.Y.
Filed Oct. 27, 1969, Ser. No. 869,769
Int. Cl. B01j 13/00
U.S. Cl. 252—309                                              7 Claims

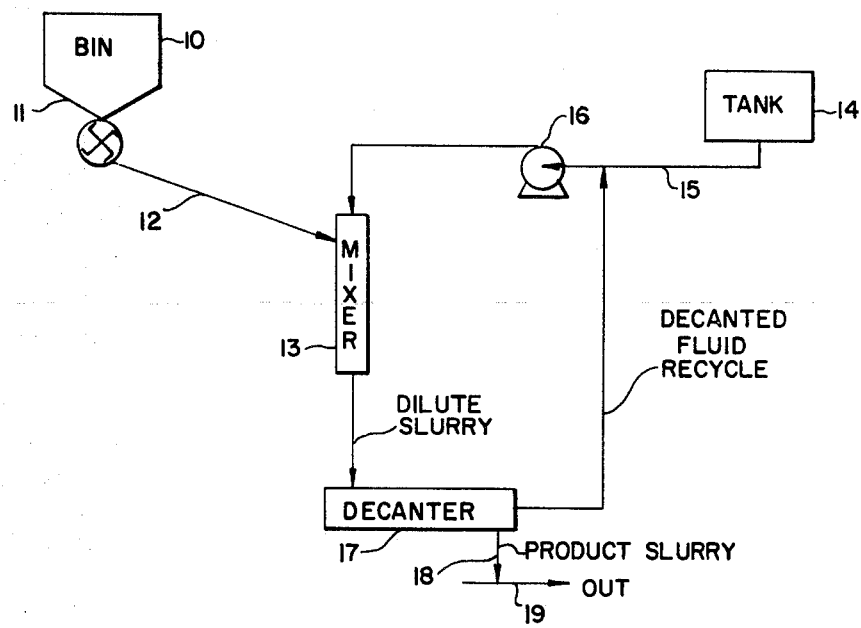
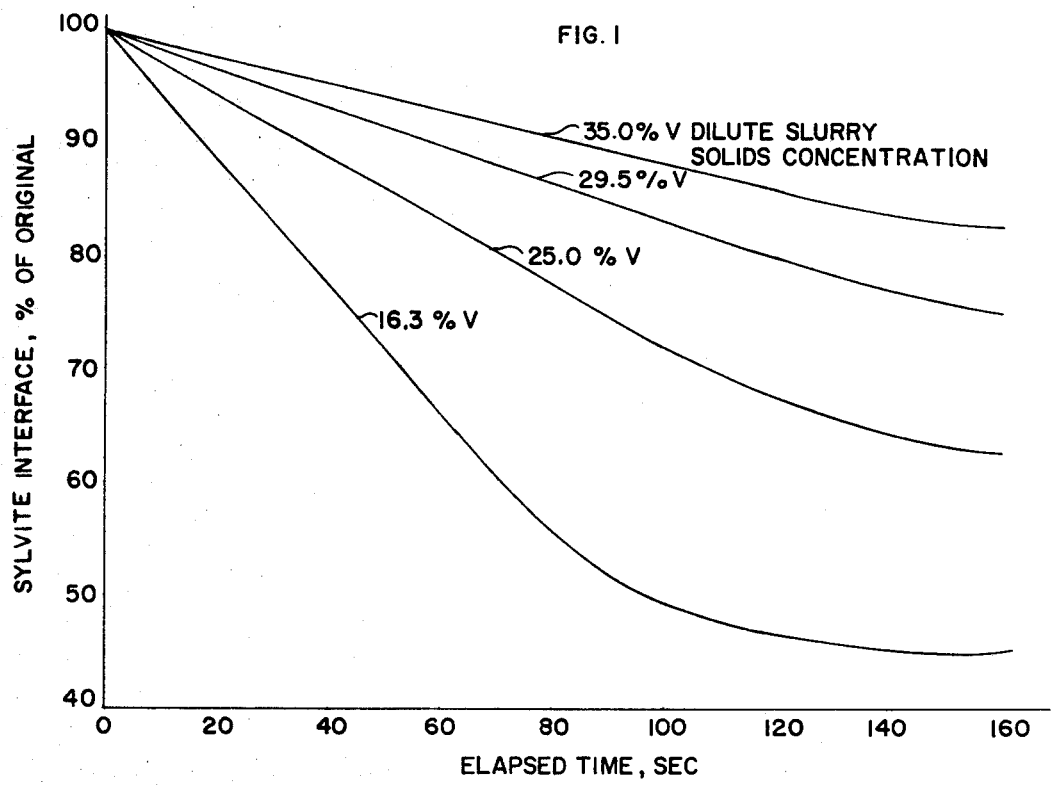
FIG. 1
FIG. 2
INVENTOR:
PAUL E. TITUS
BY: Louis J. Bovasso
HIS ATTORNEY United States Patent Office 3,703,476
Patented Nov. 21, 1972

ABSTRACT OF THE DISCLOSURE

A method for forming a slurry of an oily fluid and water-soluble solid particles for transportation through a pipeline by flowing a substantial amount of water-soluble solid particles through a mixer while continuously flowing an oily fluid into contact with the particles flowing through the mixer in an amount in excess of that sufficient to form a slurry therewith and under flow conditions whereby turbulence is created whereby the resulting turbulence effects distribution of the solid particles in the oily fluid. Excess oily fluid is then removed from the slurry while leaving sufficient oily fluid therein to maintain the slurry in a flowable condition and the slurry after removal of the excess oily fluid, may be flowed into a pipeline for transportation therethrough.

BACKGROUND OF THE INVENTION

Field of the invention

The invention relates to the transportation of solids in a pipeline; and, more particularly, to a method for forming a slurry of an oil fluid and water-soluble solid particles for subsequent transportation through a pipeline.

Description of the prior art

Water-soluble solids can be conveniently and economically transported over great distances through pipelines as heavy suspensions in oily or hydrophobic fluids such as crude oil or distillates. For the preparation of such slurries, that is, the mixing and thickening, it is desirable to use a continuous process. Contrasted with a batch preparation procedure, a continuous process does not require cyclical operation with large mixing-holding tanks, relatively high operation and maintenance costs, and solids-degrading batch mixers.

A relatively simple though effective continuous mixing scheme is to bring the solids and fluid together in a pipeline and allow the resulting turbulence (due to flow conditions) to effect solids-fluid distribution. In such systems, the energy required for mixing is transferred to the fluid by a pump and then to the slurry by the fluid, rather than being transferred directly to the slurry by a mechanical stirrer thus minimizing mechanically induced attrition of solids.

Such methods for continuous mixing are effective for certain solids-fuel slurries, such as sylvite-oil slurries, provided the resultant slurry is fluid enough to be readily and easily mixed and moved away from the primary mixing zone. The slurry fluidity, as it pertains to continuous mixing, is not only affected by the fluid viscosity, but also by solids concentration and particle size distribution. For example, a slurry calling for a relatively high solids content and/or containing solids with a relatively high portion of fines will tend to be difficult to mix by such known prior art processes, and may lead not only to maldistribution, but to mixer malfunction. Further, a continuously prepared slurry may contain gas, brought in by the solids as small bubbles, that would be not only difficult to remove but deleterious to subsequent pipeline transport.

SUMMARY OF THE INVENTION

It is an object of this invention to provide an improved method for continuously preparing a solids-fluid slurry for subsequent transport through a pipeline.

It is a further object of this invention to provide a method for effecting the continuous mixing and preparation of a solids-fluid slurry without the use of mechanical mixing means.

It is a still further object of this invention to provide an economical method whereby a solids-fluid slurry is continuously mixed and prepared without the entrainment of gas in the resultant slurry.

These and other objects are preferably accomplished by flowing a substantial amount of water-soluble solid particles through a mixer while continuously flowing an oily fluid into contact with the particles flowing through the mixer in an amount in excess of that sufficient to form a slurry therewith and under flow conditions whereby turbulence is created whereby the resulting turbulence effects distribution of the solid particles in the oily fluid. Excess oily fluid is then removed from the slurry while leaving sufficient oily fluid therein to maintain the slurry in a flowable condition and the slurry after removal of the excess oily fluid, may be flowed into a pipeline for transportation therethrough.

Contrasted with batch mixing, such continuous mixing is generally more economical in that less equipment is required, and the process is more efficient. Contrasted with continuous mechanical agitation as in certain prior art processes such as in-line blenders, the technique described hereinabove eliminates the cost and maintenance required for moving parts, and the attrition of the solids in the slurry is minimized. The detrimental entrainment of gas as small bubbles is also eliminated.

BRIEF DESCRIPTION OF THE DRAWING

FIG. 1 is a flow diagram of the preferred method for carrying out my invention; and
FIG. 2 is a graphical illustration of an example of the application of the teachings of my invention.

DESCRIPTION OF THE PREFERRED EMBODIMENT

Throughout this specification, the term "oily fluid" is broadly used to mean a non-aqueous oily fluid, such as a hydrocarbon oil which may contain a minor amount of solid particles therein, as, for example, from one to five percent.

Referring to FIG. 1 of the drawing, a flow diagram of my invention is shown. As illustrated, the solids may be introduced from any convenient source such as a bin 10. Such solids may include any water-soluble inorganic minerals, as for example, solid particles of sylvite (technical potassium chloride), potash, potash salts, sodium chloride, soda ash, sodium sulphate, phosphate rock and coal. Bin 10 preferably includes a hopper 11 at its lowermost end whereby particles in bin 10 may be released onto a conventional rotary solids feeder 12. From feeder 12, the solid particles are "fed" or passed downwardly through a mixer 13, which is preferably, but not necessarily, substantially vertically disposed and below hopper 11 so as to utilize gravity for the transfer of the particles to mixer 13.

The oily fluid, such as a hydrocarbon oil, is preferably an oily fluid that is paraffin rich and preferably consists predominantly or essentially of one or more paraffinic hydrocarbons having from one through five carbon atoms, e.g. propane, butane and pentane. However, the invention is not limited to this preferred class but may be used with other hydrocarbons boiling below 400° F., e.g. hexane, heptane, octane, and/or a petroleum naptha. The fluid may be introduced from any convenient source, such as a tank 14, and as excess amount thereof is passed, from tank 14, through line 15 and into a conventional pump 16 from which it is pumped into mixer 13 under flow conditions whereby turbulence is created. The turbulence effects distribution of the solid particles in the oily fluid. The resultant dilute slurry is flowed from mixer 13 to a decanter 17 where air and excess fluid is removed, as for example, by settling. Sufficient oily fluid is left in the slurry to maintain the slurry in a flowable condition. The decanted fluid is preferably recycled from decanter 17 back into line 15. The decanted product slurry may be removed from decanter 17 through outlet 18. From outlet 18, the slurry may be introduced into a pipeline 19 for subsequent transport therethrough as discussed hereinabove. Suitable control valves (not shown) may be associated with the process equipment illustrated in FIG. 1. In this manner, a continuous slurry preparation process is described. Mixer malfunction because of poor fluidity of the slurry formed in mixer 13, due to high solids content and/or undesirable particle size distribution, is avoided by using an excess of oily fluid to improve fluidity and then reducing the fluid content of the resultant dilute slurry by decanting. The slurry having the proper solids content may be drained off and the decanted fluid is preferably recycled back into mixer 13. The overall process is such that a slurry of the desired solids content may be continuously prepared.

By continuously flowing the oily fluid into contact with the solid particles flowing in mixer 13 in an amount in excess of that sufficient to form a slurry, the resulting turbulence effects good distribution of the solid particles in the oily fluid with little if any entrainment of gas as small bubbles in the resulting slurry.

The invention is not limited to the treatment of slurries which contain dispersed particles of any particular size or range of sizes. For example, with respect to the pipeline transport of a crude oil-sylvite slurry, it has been found that, with an oil of about 5 viscosity (70° F.), the solids content will be greater than 35% and have a particle size distribution similar to that shown in the following table.

TABLE 1

Typical Particle Size Distribution of Sylvite in Crude Oil Slurry

| Sieve No. (U.S. Std.) | Opening (microns) | Percent w. sylvite retained |
|---|---|---|
| 16 | 1,190 | 0 |
| 30 | 590 | 20 |
| 50 | 297 | 20 |
| 100 | 149 | 20 |
| 200 | 74 | 20 |
| 325 | 44 | 10 |
| −325 | | 10 |

In one example utilizing conventional continuous mixing techniques, at solids contents greater than about 35% v., it has been found that the mixing zone was frequently plugged or dry sylvite passed both due to improper and insufficient mixing. Also, gas was entrained with the sylvite to concentrations possibly detrimental to slurry rheology (1 to 3% v.).

Using the continuous mixing process illustrated in FIG. 1 and described hereinabove, the mixing difficulties previously experienced with conventional mixing techniques were eliminated. Test results showing product slurry properties at various dilute-slurry solids concentrations are shown in the following table:

TABLE 2.—CONTINUOUS MIXER TEST RESULTS

| Test | Sylvite solids concentration, percent v. | | Settling time, sec. |
|---|---|---|---|
| | Dilute slurry | Product slurry | |
| 1 | 16.3 | 36.2 | 135 |
| 2 | 25.0 | 39.9 | 210 |
| 3 | 29.5 | 42.9 | 240 |
| 4 | 35.0 | [1] 43.4 | 210 |

[1] Small amount of air entrained (<0.5% v.).

Setting curves for the dilute sylvite-in-oil slurries of Table 2 are shown in FIG. 2. No classification of the settling slurries was observed.

After transport through pipeline 19 to its ultimate destination, the slurry may be separated into its solids and fluid components by any of the means known in the art. For example, suitable separation processes are described in U.S. Pat. Nos. 3,368,876 and 3,365,279. A further process of separating solids from slurries with a fluid carrier such as oil is described in detail in a copending patent application No. 654,416, filed July 19, 1967, to June et al. In this application, a method and apparatus is described for transferring solid particles from suspension in an oily fluid to suspension in an aqueous fluid. A slurry of solid particles suspended in an oily fluid is flowed upwardly within a contactor together with a stream of aqueous fluid. The mixture of slurry and aqueous fluid is gently stirred by means of rotating a rotor shaft having a plurality of slender arms fixed thereto. The arms subdivide the oily fluid phase to prevent channelling. The mixture is flowed at a velocity sufficient to cause the solid particles suspended therein to move towards the interface formed between the oil fluid phase and the aqueous fluid phase flowing in the contactor.

Many types of solids can advantageously be separated from a crude oil-containing slurry. For example, coal can be transported as a slurry in crude oil in the manner described hereinabove and the mixture separated by deasphaltening as described in U.S. Pat. No. 2,368,876. The less desirable components, asphaltenes, of the crude oil would be precipitated and eventually burned with the coal.

I claim as my invention:

1. A method for forming a slurry of a hydrocarbon and water-soluble solid particles for transportation through a pipeline comprising the steps of:

flowing a substantial amount of said water-soluble solid particles through a mixer, said particles being selected from the group consisting of potassium chloride, potash, potash salts, sodium chloride, soda ash, sodium sulphate, and phosphate rock;

continuously flowing the hydrocarbon into contact with said particles flowing through said mixer, said hydrocarbon being in an amount in excess of that sufficient to form a dilute slurry therewith and under flow conditions whereby turbulence is created, whereby the resulting turbulenec effects distribution of the solid particles in the hydrocarbon; and removing excess hydrocarbon from said dilute slurry while leaving sufficient hydrocarbon therein to maintain the slurry in a flowable condition and recycling said excess back through said mixer.

2. The method of claim 1 wherein the step of flowing a hydrocarbon oil includes the step of flowing a crude oil.

3. The method of claim 1 wherein the step of flowing solid particles includes flowing sylvite particles.

4. The method of claim 3 wherein the step of flowing a hydrocarbon oil in an excess amount includes flowing sufficient hydrocarbon oil whereby said sylvite particles have a concentration of approximately 16 to 35% of the total dilute slurry volume prior to removing excess hydrocarbon therefrom; and the step of removing excess hydrocarbon oil from said dilute slurry includes removing sufficient excess hydrocarbon oil therefrom whereby said sylvite particles have a concentration of approximately 36 to 44% of the total slurry volume after removing said excess hydrocarbon.

5. The method of claim 1 wherein the step of continuously flowing the hydrocarbon includes the step of continuously pumping said hydrocarbon downwardly through said mixer into contact with said particles.

6. The method of claim 1 wherein the step of removing excess hydrocarbon from said dilute slurry includes the step of settling said slurry, and decanting said excess hydrocarbon.

7. The method of claim 1 wherein the step of flowing said particles through a mixer includes the step of flowing said particles downwardly through a substantially vertically disposed mixer.

References Cited

UNITED STATES PATENTS

| | | | |
|---|---|---|---|
| 3,260,548 | 7/1966 | Reichl | 299—18 |
| 3,456,987 | 7/1967 | Hughes et al. | 252—309 X |

OTHER REFERENCES

Perry: Chemical Engineer's Handbook, McGraw-Hill, pp. 19-3, 19-11 and 12.

JOHN D. WELSH, Primary Examiner

U.S. Cl. X.R.

302—66; 208—370